(12) United States Patent
Abu-El-Zeet et al.

(10) Patent No.: US 7,275,018 B2
(45) Date of Patent: Sep. 25, 2007

(54) METHOD OF CONDITION MONITORING

(75) Inventors: Ziad Hasan Abu-El-Zeet, Ramallah (IL); Vijaykumar Chhaganlal Patel, Leicester (GB)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 11/468,332

(22) Filed: Aug. 30, 2006

(65) Prior Publication Data

US 2007/0192063 A1    Aug. 16, 2007

Related U.S. Application Data

(60) Provisional application No. 60/743,269, filed on Feb. 10, 2006.

(51) Int. Cl.
*G21C 17/00* (2006.01)
*G06F 11/00* (2006.01)

(52) U.S. Cl. .................. 702/182; 702/183; 709/224

(58) Field of Classification Search .............. 702/179, 702/182–186, 188, 189; 709/224; 244/100 R; 707/104.1
See application file for complete search history.

(56) References Cited

U.S. PATENT DOCUMENTS

| 7,039,554 | B2 * | 5/2006 | Nguyen et al. .......... 702/183 |
| 2003/0126258 | A1 * | 7/2003 | Conkright et al. ......... 709/224 |
| 2003/0139908 | A1 * | 7/2003 | Wegerich et al. ......... 702/183 |
| 2004/0078171 | A1 * | 4/2004 | Wegerich et al. ......... 702/188 |
| 2004/0243636 | A1 | 12/2004 | Hasiewicz et al. | |

FOREIGN PATENT DOCUMENTS

| WO | WO01/48571 | 7/2001 |
| WO | WO02/057856 | 7/2002 |
| WO | WO2004/042531 | 5/2004 |
| WO | WO2005/008420 | 1/2005 |

OTHER PUBLICATIONS

Nairac, A., et al., "Choosing an Appropriate Model for Novelty Detection," Artificial Neurel Networks, Fifth International Conference, Jul. 7, 1997, pp. 117-122, No. 440, IEEE, Cambridge, UK.

(Continued)

*Primary Examiner*—John Barlow
*Assistant Examiner*—John H. Le
(74) *Attorney, Agent, or Firm*—Cermak Kenealy & Vaidya LLP; Adam J. Cermak (57) ABSTRACT

A method for the condition monitoring of a fleet of machines, plants, or processes includes the generation of a single generic network for the fleet using historic data from the members of the fleet and using novelty detection tools for analyzing and reducing the data. Scaling factors relevant to each individual fleet member are stored in a scaling file. The fleet members are monitored during operation by comparing test data to the network and calculating quantization errors. Signals on the condition of the fleet members are given based on the quantization errors. The network is adapted by adding new data representing changes in a plant such as due to degradations of components. Due to the individual scaling of data from the different fleet members, the method achieves a sensitivity of monitoring that is comparable to that of methods of the state of the art.

9 Claims, 7 Drawing Sheets

OTHER PUBLICATIONS

Mascioli, F. M. Frattale, et al., "A constructive approach to neuro-fuzzy network," Signal Processing 1998, pp. 347-358, vol. 64, Elsevier Science Publishers B.V., Amsterdam, NL.

Qiu, H., et al., "Feature Fusion and Degradation Detection Using Self-Organizing Map," Machine Learning and Applications, 2004, Proceedings, 2004 International Conference on Louisville, KY, USA, p. 107-114, IEEE, Piscataway, NJ, US.

Tarassenko, L., et al., "Novelty Detection in Jet Engines," IEE Colloquium on Condition Monitoring Machinery, External Structures and Health, 1999, pp. 1-5, IEE, Savoy Place, London, UK.

Search Report for EP Patent App. No. 06119665 (Feb. 26, 2007).

* cited by examiner

METHOD OF CONDITION MONITORING

This application claims priority under 35 U.S.C. § 119 to U.S. provisional patent application No. 60/743,269, filed 10 Feb. 2006, the entirety of which is incorporated by reference herein.

BACKGROUND OF THE INVENTION

1. Field of the Invention

The invention pertains to a method of condition monitoring of a fleet of plants, machines, or processes. It pertains in particular to a method of condition monitoring of a fleet of electrical power generation plants as well as machines and processes associated with such power plants.

2. Brief Description of the Related Art

The operation of electrical power plants and associated machines and processes are frequently monitored in order to determine the condition of its individual components, values of operational parameters, and the performance of the plant as a whole. Condition monitoring allows optimization of plant operation and determination of expected operational lifetime of its components. It is also intended for early detection of operational parameters that exceed given normal operational ranges and alerting of plant engineers of operational problems or failure developments. As such, it can effectively reduce potential and costly downtime and increase operation safety and performance of a power plant or its associated machines. It also allows reliable indication of necessary maintenance.

Various methods of monitoring machines or plants have been presented in the state of the art. Many of these are directed to the monitoring of a single machine or process, such as for example in WO 2004/042531 and WO 2005/008420. These methods can typically be realized using standard computing tools within a reasonable time frame, and with reasonable computing power.

WO 02/086726 discloses a method of monitoring and controlling a single machine or process using a combination of diagnostics and model-based monitoring and control. Estimated sensor values are generated by an empirical model based system and compared to actual sensor values. Residual values obtained by subtraction of estimated values from real values are subjected to a sequential probability ratio test, which allows early detection of deviations of the residuals from a threshold value.

WO 02/057856 discloses a predictive monitoring of a single process or machine based on empirical model-based surveillance or control. For the monitoring method, a representative set of sensor data is used that is consistently adapted and updated by the addition of newly acquired values, which replace the previous values.

US 2004/0243636 discloses a method of monitoring the condition of an entire fleet of power plants. In this method a common software platform serves to monitor the fleet, where a modeling method is coupled with an incident logic engine for registering power plant incidents. A specific model is created for each member or asset of the fleet to be monitored. For this, historic data from each plant is used to create a model for an operating condition considered normal. Each specific model is called up individually to generate a model for that particular fleet member, which is used to estimate engine operation parameters during real-time operation. The estimated operational parameters are compared to actual measurements of the same parameters in order to produce residual signals, which can indicate the condition of the plant.

Each individual empirical model is adapted incrementally, requiring separate model maintenance for each member in the fleet. The maintenance of the models involves the analysis of a large amount of data for each member of the fleet and hence a large effort in terms of engineers' time and computing power.

SUMMARY OF THE INVENTION

In view of the described background art, one aspect of the present invention includes providing a method of monitoring the condition of an entire fleet of plants, machines, or processes, such as electrical power generation plants and/or their associated machines and industrial processes, the method allowing the efficient handling, both in terms of time and engineering effort, of large amounts of multidimensional data including individual component and operational parameter data. The method is advantageously developed and maintained with reduced effort compared to the methods of the state of the art. Furthermore, it preferably does not require prior knowledge of the physical process performed by the machine or processes and, in particular, can ensure optimal monitoring sensitivity comparable to that of known methods.

According to the present invention, an exemplary method of monitoring a fleet of plants, machines, or processes includes a training or generating model mode followed by a monitoring or test mode, the method including the steps:

generating and storing a single generic model for all members of the fleet using a novelty detection Tool (ND-Tool), using input data from each of the individual fleet members that is individually scaled prior to being entered into the single generic model, monitoring the fleet members during operation by testing measurement data against the model, giving a signal or alert of the condition of the fleet based on a comparison of test data against the generic model.

The single generic model for all fleet members is based on past or historic data of members of the fleet operating in several normal operation modes.

A normal operation mode of a plant or machine is, for example, the operation of an electrical power plant at a typical load within expected ranges of power output and efficiency and at typical environmental conditions.

The single generic model, here also referred to as a generic network, is generated using data-driven novelty detection (ND). The use of such novelty-detection allows that no previous knowledge of the physical process occurring in the plant or machine is required. The generic network contains measurements of all pertinent parameters of all fleet members as well as the interrelationships between said measurements.

For the generation of such a network, an exemplary method includes the steps of:

analyzing and reducing measurement data of parameters of all members of a fleet of machines, plants, or processes using novelty detection and a clustering method. For the analysis of the measurement data, a mean value is subtracted from the individual measurement data points and the resulting difference is divided by the standard deviation. This is referred to herein as scaling, standardizing, or normalizing the data. For the reduction of the measurement data, groups of the standardized measurement data points are taken to form a cluster, where for each cluster a cluster center is determined and stored that represents a mean value of that data cluster. Then, for each cluster, a cluster threshold is calculated and stored for use by novelty detection during monitoring. Preferably, the method uses k-means clustering. The cluster centers and the calculated thresholds then make up the generated generic network. Through this clustering and thresholding it is possible that not all the measurement data must be stored, but only the cluster centers and the thresholds.

Further, an exemplary method includes:

storing the mean values and standard deviations for each member of the fleet as scaling factors in a scaling file for further use of the mean values and standard deviations for each fleet member for scaling the input data during monitoring mode, monitoring the members of the fleet of plants, machines, or processes by taking test data during operation of the fleet members, scaling the test data using the scaling file, and comparing the scaled data to the stored, generic model, establishing a measure of fit between test data and model using a distance function and determining a quantization error for each data point, based on the quantization error, giving a signal or alert on the condition of fleet members.

A plant, machine, or process changes as time progresses, for example due to degradation of its components, properties such as size, shape, thermal and chemical composition, etc. Hence it is necessary, or at least preferable, to adapt the generic network by adding new data points according to new measurements during operation of the machine or process while maintaining all previously existing data in the network. Preferably, clustering of newly added data is first carried out before appending it to the network.

A method according to the present invention preferably includes two stages, the generation or training of a generic network for the entire fleet, and the actual monitoring of each fleet member using the generic network. The method can be characterized by time and engineering efficiency realized by the concept of the generation of one single generic network for use for the entire fleet. Additionally, the generation of the generic network in itself is performed efficiently in terms of time and engineering effort due to the use of novelty detection and clustering.

Depending on the type of plant, machine or processes that is monitored, the generic network is maintained in a further stage of the method. The generic network is adapted or retrained by the addition of further new data without the deletion of previous data. The mere addition of data is enabled by the use of novelty detection. The adaptation of the network can again be characterized by time and engineering efficiency as only one model must be adapted or maintained.

Exemplary methods according to the present invention use an empirical data-driven model. The development of a data-driven empirical model is easier than that of a physical model, in particular for a multidimensional process as found in an electrical power plant. Normally, the generation of data-driven models for such plants is time consuming, especially if a model for each member of an entire fleet of plants must be generated. Therefore, it is desirable to limit the effort involved. In view of this, the presently disclosed method is characterized by the use of a generic network that serves as a model for an entire fleet of plants, machines, or processes, as opposed to only for a single member of a fleet. It allows a time efficient generation, adaptation, and scaling of the model for the generation of the generic model and monitoring thereof. The model is efficiently generated by means of efficient analysis of historic data enabled by the use of novelty detection tools. The sensitivity of the generic model is upheld by scaling of the input data using the mean values and standard deviations from each individual fleet member.

The use of a generic model or network effects a significant reduction of the engineering effort. For example, the time required to generate models is reduced from several weeks or months to only a few days for an entire fleet. The computing effort is also significantly reduced by the application of the novelty detection tools and clustering, which allow that only one data analysis needs to be performed for the generation of the generic model. Consequently, the updating and maintenance of the model is also realized in a shorter time frame. While an enormous advantage is gained in terms of time and the amounts of data to be handled, the monitoring sensitivity is maintained at a level comparable to that of methods of the state of the art due to the use of the mentioned scaling factors for each individual fleet member.

The use of novelty detection and clustering methods enables the efficient data analysis in generating the model network and further enables the efficient adaptation of the model during monitoring. In particular, it allows the adaptation of the network by simple addition of new data to the network. Thus, previous knowledge and experience gained by the network is never lost. Old states of a fleet member, which represent valid operation condition of the fleet member, could be encountered again and are thus of value in the model.

The novelty detection tool is data-driven in that it uses past or historic data acquired during operation of the machine or plant during a given typical operation mode. The generation of the network or model generated from this data therefore requires no previous knowledge of the physical process performed by the machine or plant. The generated network encompasses not only all the acquired data but also all the interrelationships between the different measured data. For this reason the method according to this invention is particularly suited for large dimensional processes, as found in an electrical power plant or a chemical process plant, and where physical models are particularly difficult to obtain.

Methods embodying principals of the present invention can ensure an optimal sensitivity in spite of the use of a generic network. The sensitivity is upheld due to the use of the individual scaling of the input data from each fleet member for the generic network. The sensitivity of the monitoring of a particular fleet member achieved by this method is close and comparable to the sensitivity that would be achieved by a model specifically generated for that particular fleet member without the use of the generic network.

Exemplary methods according to the present invention can have a particular advantage for the monitoring of a new fleet member added to an existing fleet. Normally, for a newly commissioned plant or machine, at first data would need to be collected in order to establish a data set to be added to the model. A method according to the invention, however, enables immediate monitoring using the generic network and using scaling factors derived from other similar plants in the fleet. The derived scaling factors can be used for scaling the input data and then monitoring the plant operation. Since derived scaling factors are used in this case, as opposed to scaling factors specific to the fleet member, the sensitivity to faults would naturally be compromised. Such a set-up hence allows the detection of gross faults in the new plant until specific scaling factors are obtained for the new plant as operating data is collected.

DETAILED DESCRIPTION OF EXEMPLARY EMBODIMENTS OF THE INVENTION

Figure 1:
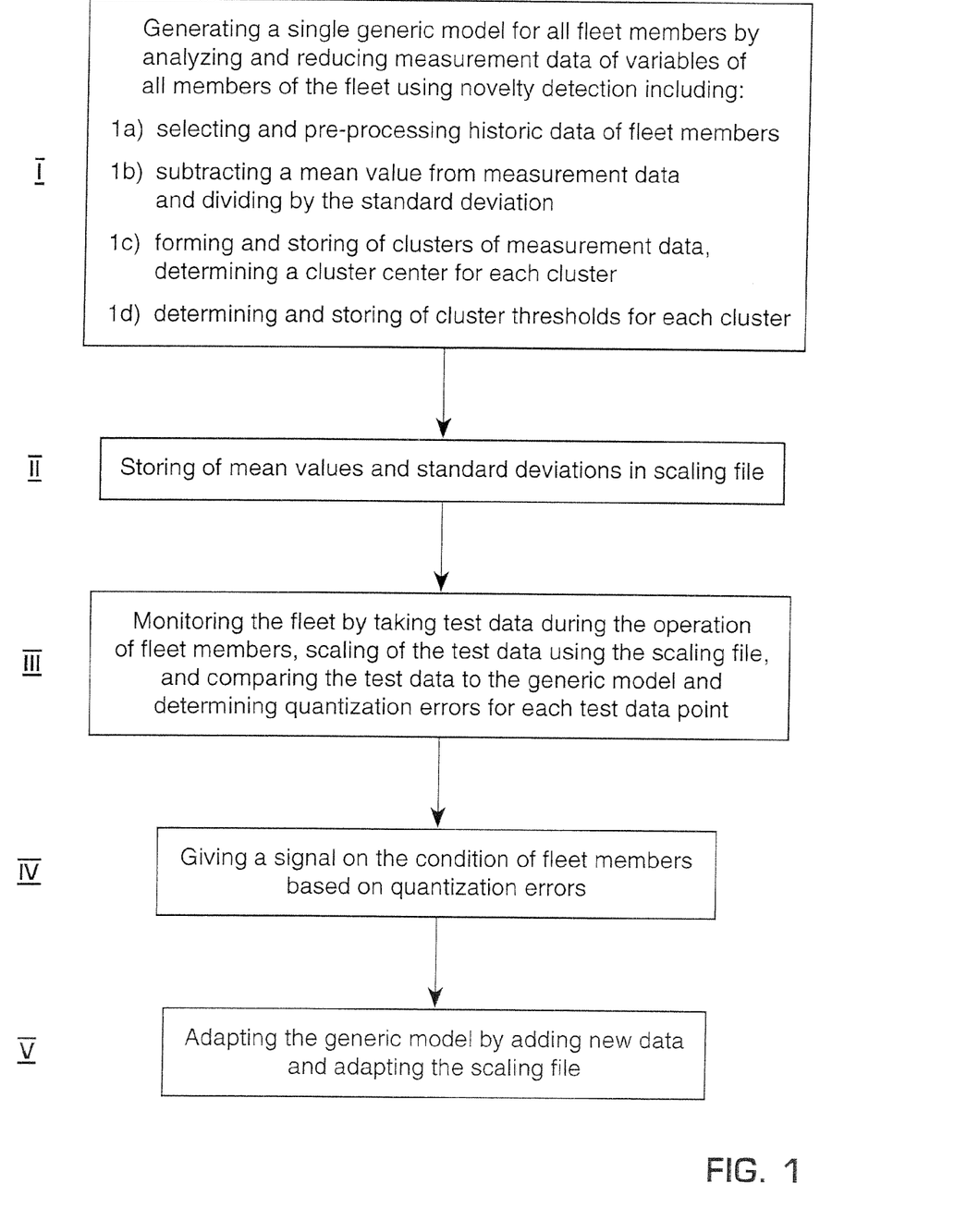
FIG. 1 shows a flow chart of a method for condition monitoring according to the invention in steps I through V referred throughout the following detailed description.

An example of the method according to the invention is disclosed herewith in an exemplary application to the monitoring of a fleet of electrical power plants. The flow chart in FIG. 1 shows steps I through V.

The generation of the generic network (step I), which is herein also referred to as the training of the generic network, is carried out by careful selection of a data set (or training data set) representing the normal operation of the monitored electrical power plant (step Ia). The normal operation refers, for example, to the operation of the power plant at a typical load, at typical atmospheric conditions (e.g., pressure, temperature, humidity), for a typical performance (e.g., power output, efficiency, pollutant levels) that the power plant was designed for. A selected data set includes, for example, data from over 250 variables monitoring the flow of compressed air from the compressor (pressure, temperature), outside temperature and pressure, flow of fuel into the combustion systems, temperature values at various turbine stages and components, vibration signals from bearings, etc.

In a preferred method according to the invention, the data for the generation, or training, of the network is selected and pre-processed (step Ia). The pre-processing phase comprises outlier removal and transient data removal. Outliers can either be removed through manual inspection of the data or by an automated method using software designed to detect them. Transients associated with operating point changes or shifts are removed from the data sets. This can be performed either manually, which can be time consuming, or by an automated method using a software designed for each variable and/or operating condition.

Generating or training the network is carried out using a thus carefully selected data set representing a normal or typical operation of a power plant to be monitored.

Then, the data is standardized, normalized or scaled (step Ib) in a way that ensures each variable has equal weight. This is done, for example, by first subtracting from the data the sample mean of each variable, because the objective is to capture the variation of the data from the mean. Secondly, each variable of the mean centered data is divided by its standard deviation. This scales each variable to unit variance ensuring that the process variables with high variances do not dominate. This procedure must be carried out prior to generating or training the network. The mean values and standard deviations are stored in a file for further use in scaling of the individual input data from the individual fleet members during monitoring mode.

Once the data is pre-processed, for example, by removal of outlying data points, removal of transient data (as opposed to steady-state data), and is normalized or standardized, clustering is applied (step Ic).

For the clustering, preferably k-means clustering as known in the state of the art is used (e.g., J. B. MacQueen (1967): "Some Methods for classification and Analysis of Multivariate Observations, Proceedings of 5-th Berkeley Symposium on Mathematical Statistics and Probability", Berkeley, University of California Press, 1:281-297).

For the clustering of the training data, the number of clusters to represent the data must also be determined. The choice of number of clusters affects how accurately the network represents the training data and hence affects the sensitivity of the network and the final condition monitoring. There is a trade-off between the number of clusters and the achievable sensitivity and the amount of computational time required. According to the present method, the number of clusters can be determined by a number of ways, with one of the following two different ways being merely preferred.

The first is known as the Davies-Bouldin (DB) Cluster Validity Algorithm (described in Davies D. L. and Bouldin D. W., "A Cluster Separation Measure", IEEE Trans. Pattern Anal. Machine Intell. 1(4), p. 224-227). The algorithm maximizes the distances between clusters while minimizing the distances within a cluster itself. A DB-index is determined as a function of the ratio of the sum of the distances within a cluster to the distance between clusters. The smaller the DB-index, the greater the quality of the clustering achieved.

Figure 2:
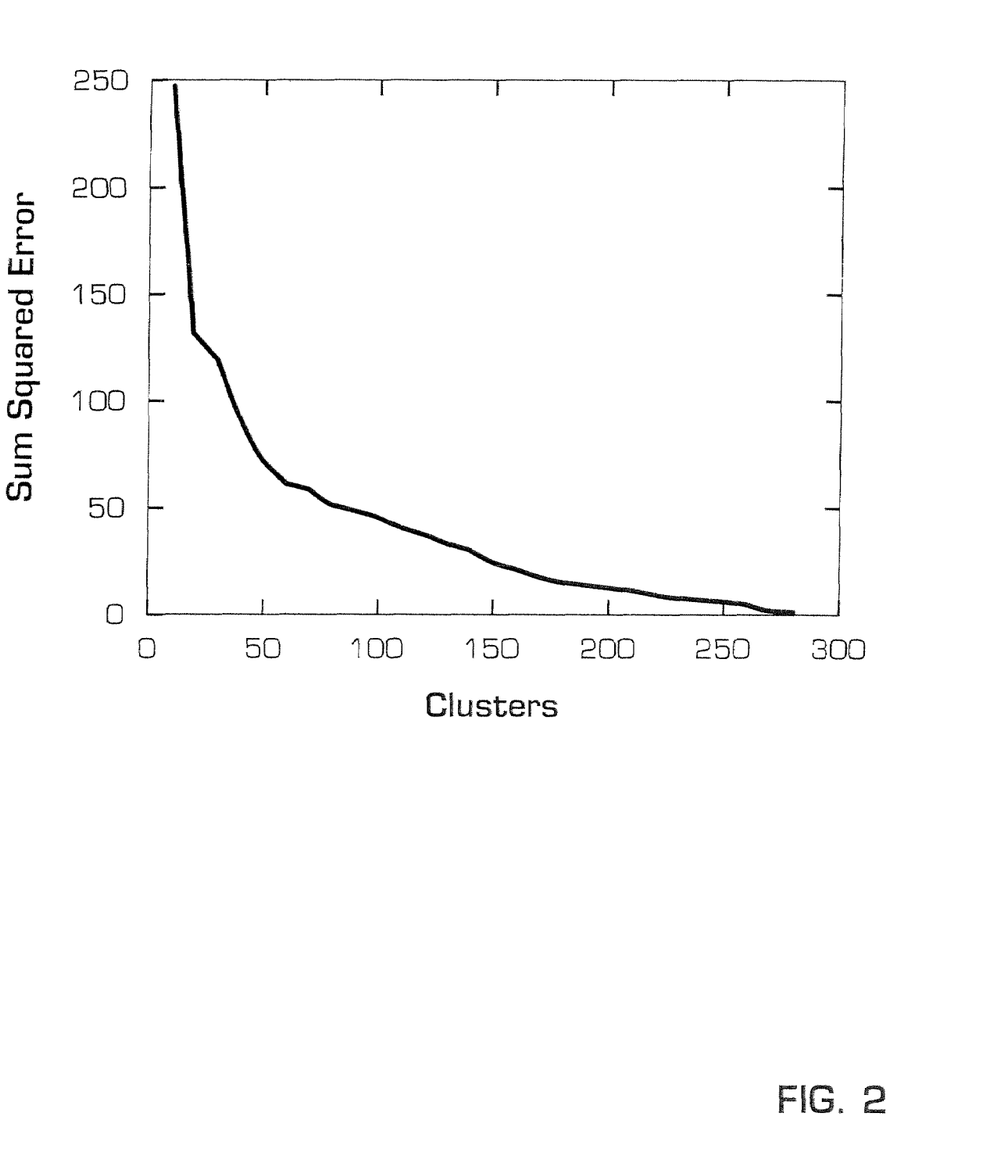
FIG. 2 shows a plot of sum squared errors as used for the determination of the number of clusters.

The second way of determining the number of clusters is a visual method using a plot of the Sum Squared Error (SSE) vs. the number of clusters used in the network as shown in FIG. 2. The extreme case would be if the number of clusters is chosen to be the same as the number of data samples, then the SSE would be zero. An optimal choice of number of clusters would be the point at the "knee" of the curve indicated by the intersection with the vertical line near the 50-mark. In order to obtain this optimal point, the network has to be trained using an incrementally increasing number of clusters and calculating the SSE for each. As this is time consuming, the procedure is speeded up by the use of random subsets of the original data set composed of a small fraction of the original data. To increase the accuracy of the estimation, the analysis is run several times using different random permutations of the data.

This approach of using random permutations may also be applied to the obtaining of the DB-index.

The positions of the cluster centers obtained by means of the k-means clustering are stored as reference profiles for the different operating conditions. Each cluster center represents the mean value of all the profiles attributed to that particular cluster during training of the network. Then, thresholds for each individual cluster are calculated and stored for use by the novelty detection logic in the following test or monitoring mode. The cluster centers along with the calculated thresholds make up the network or model.

The calculation of the threshold (step Id) can be performed by any of numerous method, two being preferred. One way is to choose a minimum/maximum threshold. This means that the threshold on a cluster center is set by the maximum deviation from the center of any of the samples in that cluster. Another way is to use statistical thresholds, which means setting the threshold level between 1 and several standard deviations. The choice between the two ways may be a weighing of the sensitivity of the resulting condition monitoring method and minimization of potential false alerts due to the monitoring.

In order to generate the generic model the historic input data from the individual fleet members is scaled, and the scaling factors are stored in a scaling file (step II). This file contains the mean values of the individual variables and their standard deviations. Each individual fleet member will have a set of scaling factors stored in this file. The stored scaling factors are based on an amount of data large enough such that it is representative of the particular fleet member in a particular operation mode. The scaling files are also updated during a monitoring mode as the fleet members change with time.

In monitoring or test mode, previously unseen data representing new samples collected from a power plant are tested against the stored network (step III). A measure of fit against the stored network is established using the Euclidean Distance (ED) or a similar multivariate distance measure. This is a three-phased process where the new sample of measurement data is first normalized or standardized using the stored normalization factors in the scaling file (mean and standard deviations relevant to each individual fleet member) and then in a second phase compared against all the cluster centers stored in the network. The measurement data sample is allocated to the Best Matching Center (BMC) according to the ED. Once the BMC is known, in the third phase, the stored thresholds for the BMC in question are used to calculate the Quantization Error (QE), which is a measure of novelty or a measure of how far the measurement data during monitoring or test is away from the training data according to the network or model. The QE is a measure of how far the test sample is outside the thresholds surrounding the BMC. In the case that the QE exceeds a given threshold value, an alert or warning signal, or any appropriate control signal is given, for example by email, to a control engineer or the plant operation control system (step IV).

In a preferred method, the test data taken during monitoring mode is "cleansed" of transient data and outliers, in the same manner as the training data was selected by removal of such transients and outliers. As described in the case of training data, this data can be prepared manually or by use of an automated process using appropriate software.

The method according to the invention may be performed using computers with state of the art processors and current scientific analysis and display software, such as MATLAB®.

The following shows and elaborates on the condition monitoring method performed on an electric power plant.

For demonstration purposes, a data set from a power plant representing data collected over a one-month period was used to train a network. Larger data sets would normally be used for training so that different operating conditions are included as well as varying atmospheric conditions. Once the network was trained, a set of test data collected over the subsequent month was presented to the network for testing.

Figure 3:
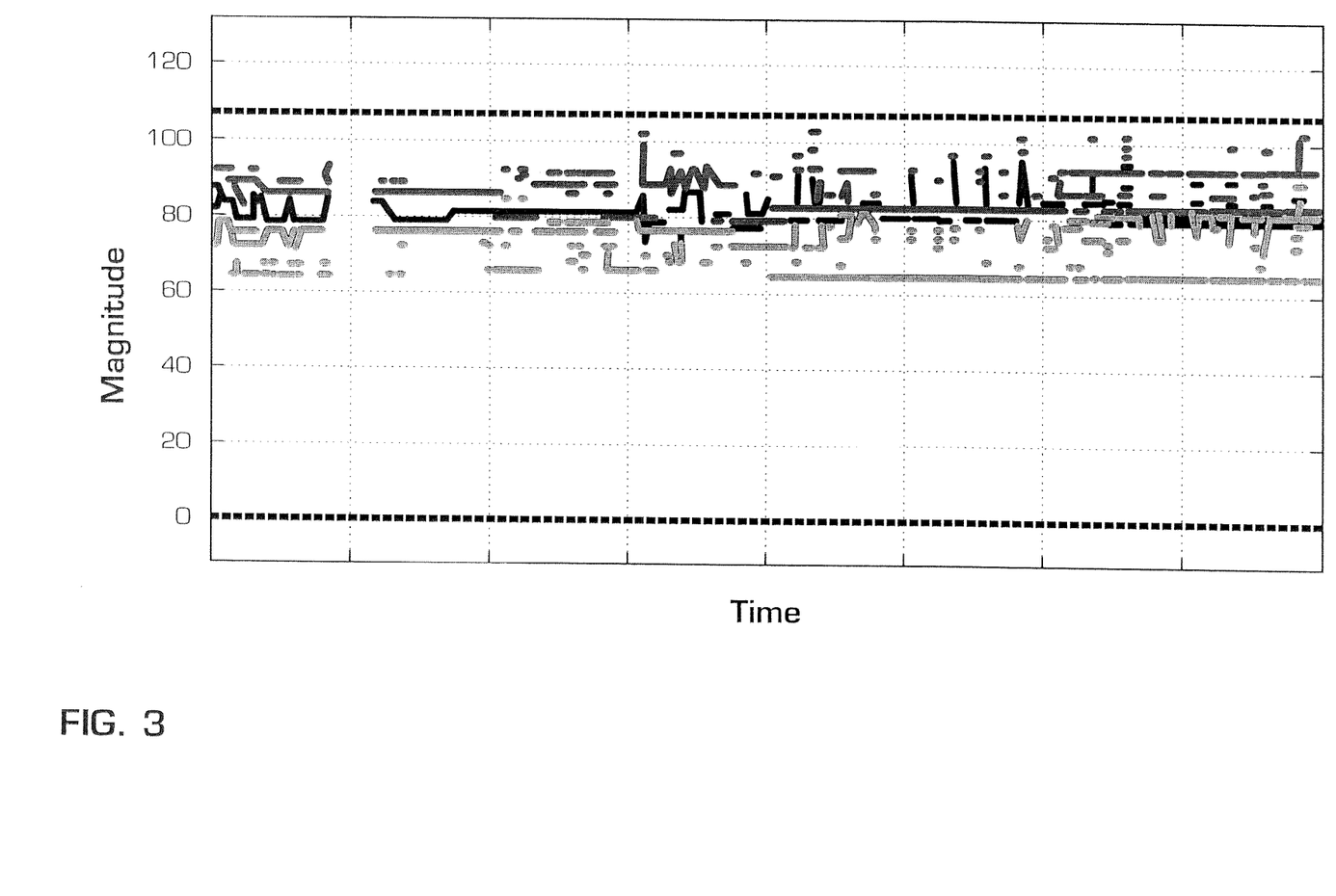
FIG. 3 shows a plot of test data from an electrical power plant presented during monitoring and analyzed by the novelty detection method.

The results are shown in the plot in FIG. 3. The plot relates to a first variable. The solid black line shows the trend of the actual test data as a function of time. The broken black lines at the top and bottom of the plot show the lower and upper range of data encountered in the training set for the particular variable. The dark gray lines and the light gray lines show the upper and lower thresholds, respectively, of the particular BMC selected as being closest to the current data sample.

Figure 4:
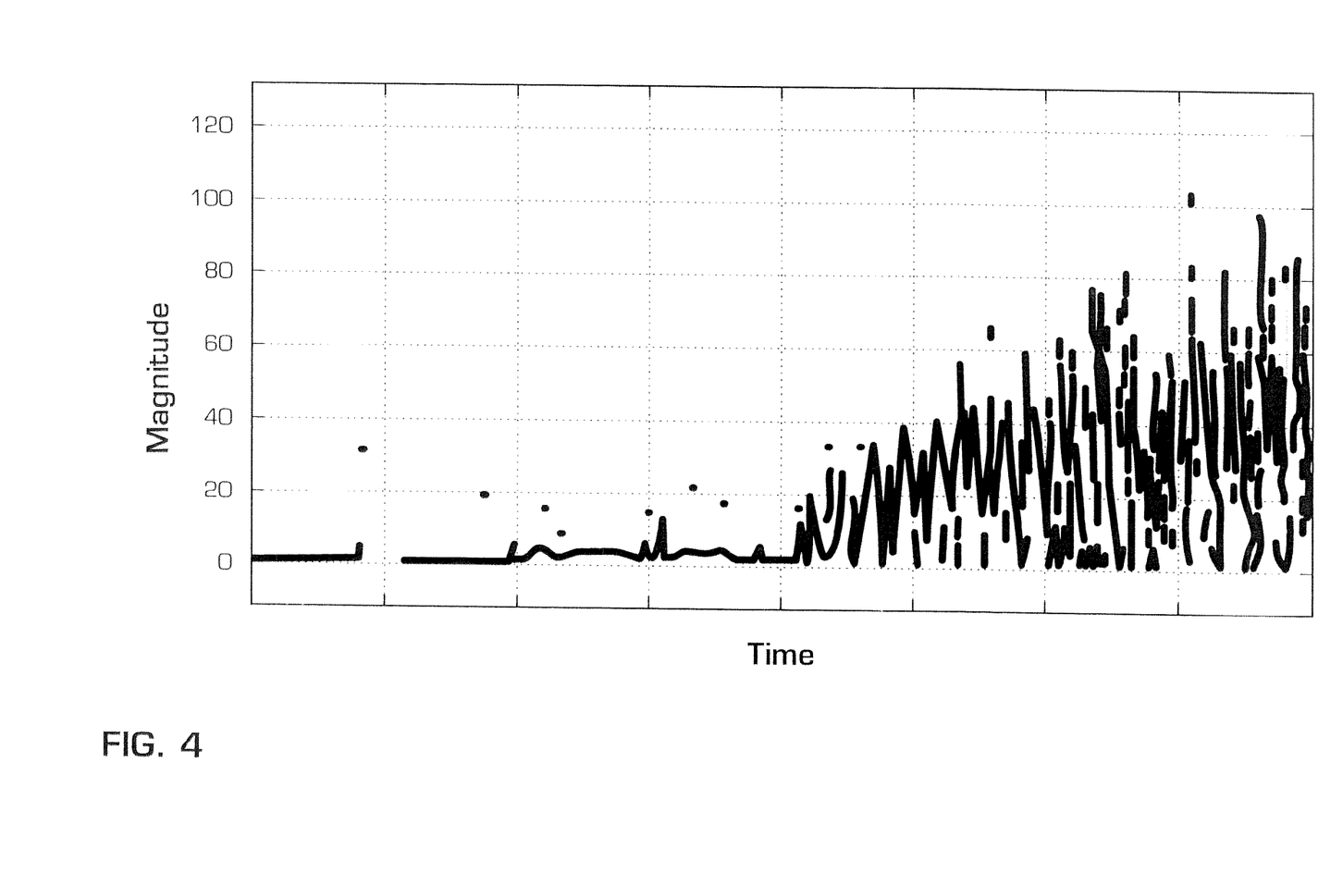
FIG. 4 shows a plot of a sum of quantization errors as determined by the method according to the invention.

Examining each individual variable in a plot similar to the plot in FIG. 3 would be quite cumbersome. A useful plot providing a bird's eye view of the health condition of the plant is the sum of the QE for all variables considered, which is shown in FIG. 4. This immediately shows a problem developing from the middle of the plot. The overall QE rises from single figures to between 60 and 80 towards the end of the plot.

The monitoring method allows a closer inspection of the QE contributions from the individual variables involved. For example, a control engineer would inspect the top ten contributing variables and can identify which variable or several variables generate the largest QE. This allows the engineer to see whether these variables are within their expected ranges, and if not, attend to the particular problem by replacing a particular component or adjusting an operating parameter in order to solve the problem. Thanks to the time efficiency of the monitoring method using novelty detection, the control engineer or plant operator is enabled to detect and correct problems in time before larger problems or dropping plant performance develop.

Through the use of novelty detection, the monitoring process can be made relatively easy for the plant operator. Instead of having to analyze many variables, it is possible to focus on a particular problem with little effort. Large faults caused by one particular variable can sometimes mask other underlying problems of less severity. It is possible to overcome this problem with the novelty detection by for example excluding the top contributor and only showing the next highest contributors and focusing on the other variables and checking whether they remain within their expected ranges or a trend in the variable values.

During operation and monitoring of the power plant, the generic network may be adapted or retrained as time progresses and individual components may degrade or operating conditions change (step V). For this, new measurement data is taken, standardized and scaled by subtraction of mean values and division by the standard deviation in the same manner as the initial data was standardized. The new standardized measurement data is then clustered in the same manner as the initial data and finally added to the generic network. In the adaptation of the network, the network is retrained by simple addition of new data and without a complete retraining of the entire network. The addition of data is enabled by the use of novelty detection, which allows again an efficient adaptation of the network.

Figure 5:
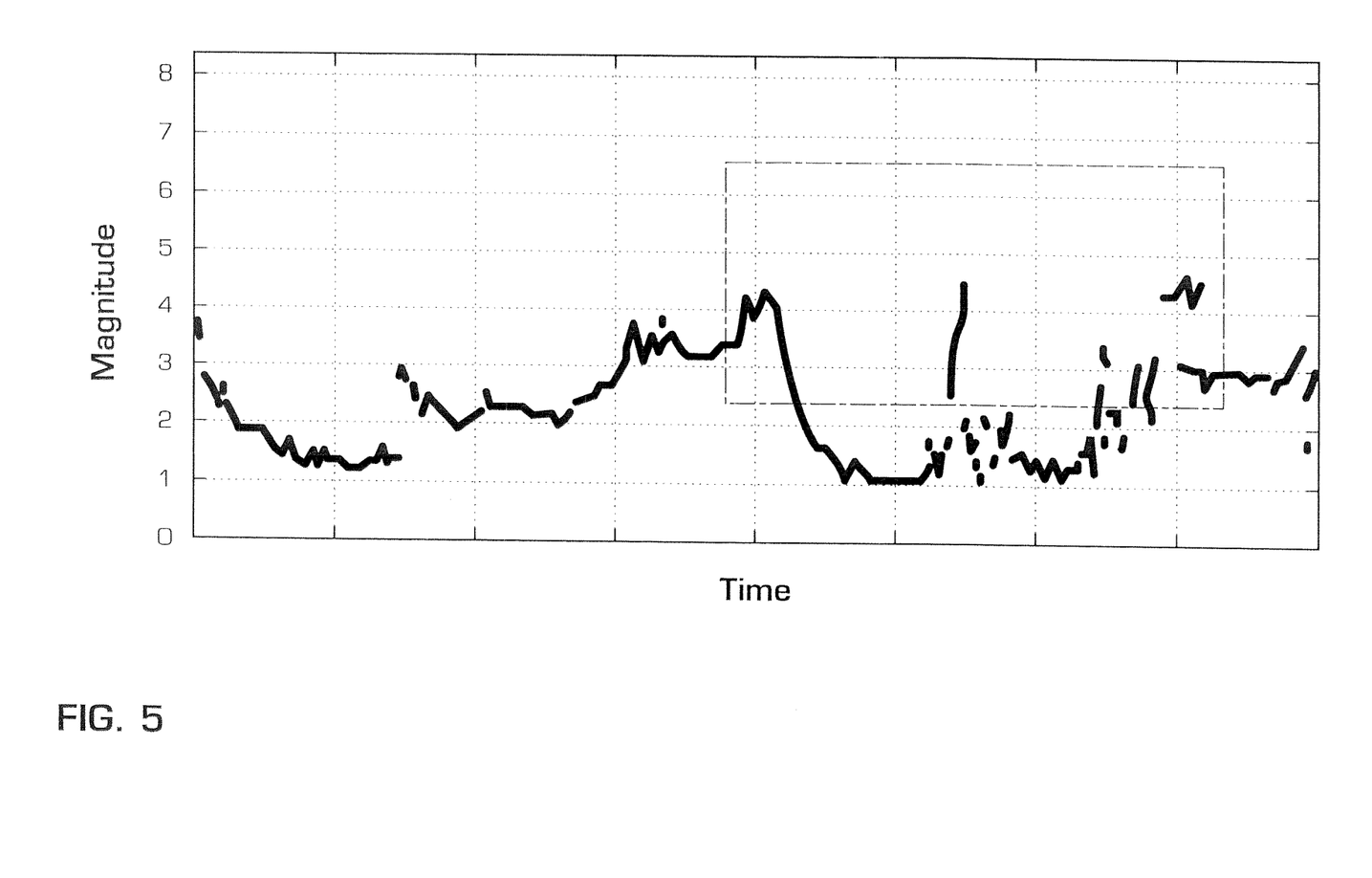
FIG. 5 shows a plot of quantization errors for variables from a power plant in a given operation mode that is to be included as newly added data to the network.

The generic network is adapted in the case when a plant engineer identifies, based for example on the sum of quantization error QE or the QE of a particular set of variables, that a particular condition of the plant needs to be included in the network. The engineer may select interactively the data relating to the condition of the plant to be included, as shown by the boxed-in set of data in FIG. 5. In the shown example, only the section of data highlighted by the rectangle is chosen for the adaptation. In the range shown, the QE has values of about 4.

Figure 6:
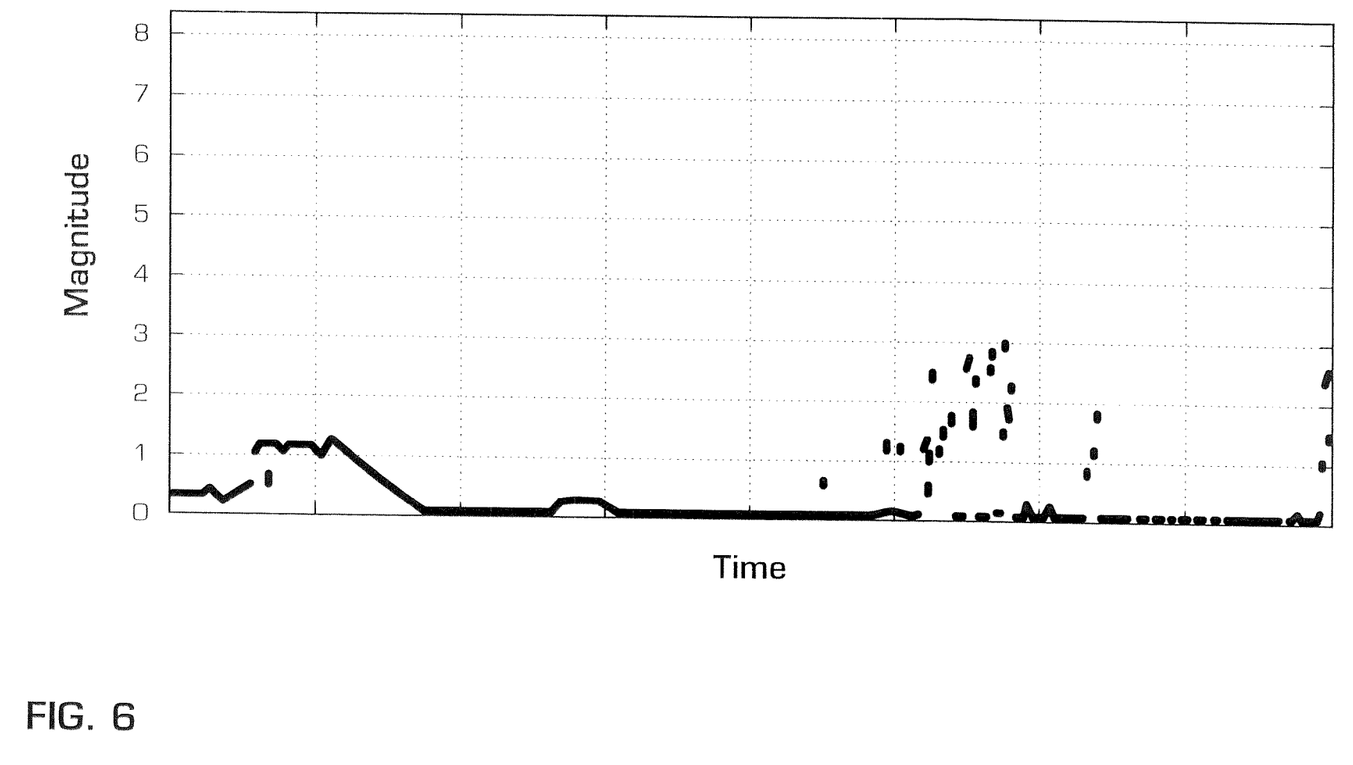
FIG. 6 shows a plot of quantization errors for the same power plant and operation mode referred to in FIG. 5 and after the network has been retrained with the newly added data.

The network is adapted without a retraining of the entire network and by adding the particular data to the network. Once new BMCs are added to the network, the QE is recalculated as shown in FIG. 6. Compared to the QE values in FIG. 5, the QE values in FIG. 6 have dropped considerably to values about 1 and 3. This indicates that the novel condition has been included and "learned" by the network.

Figure 7A:
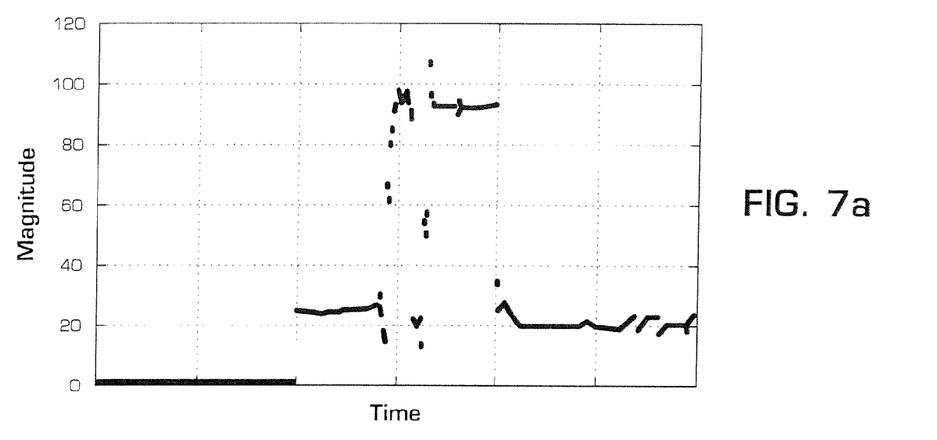
FIG. 7a shows a plot of quantization errors resulting from a monitoring of a plant using a plant specific network.
Figure 7B:
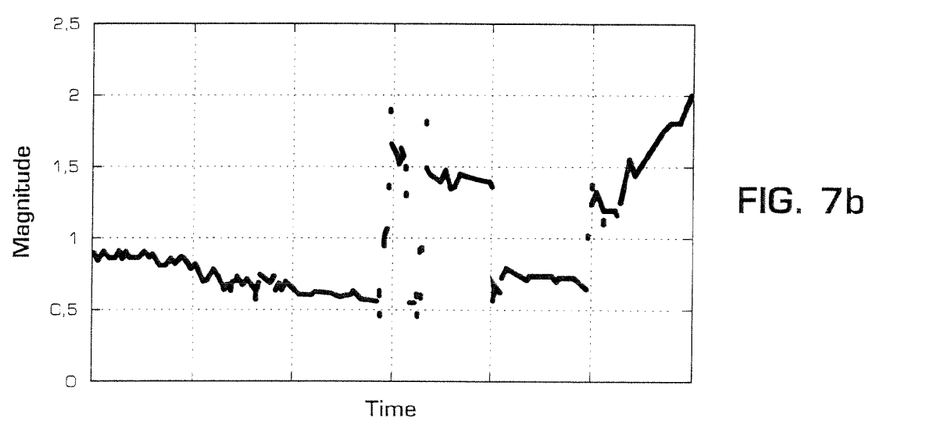
FIG. 7b shows a plot of quantization errors resulting from a monitoring of same plant using a generic network that has been globally scaled.
Figure 7C:
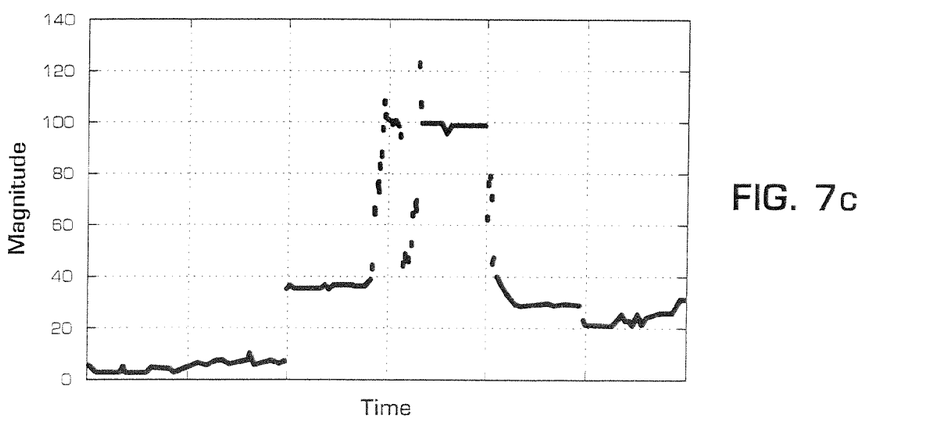
FIG. 7c shows a plot of quantization errors from a monitoring of same plant using an individually scaled generic network according to the invention.

Methods according to the invention can ensure a sensitivity of monitoring comparable to models of the state of the art, such as for example a model that is specifically designed for an individual plant (as opposed to an entire fleet). FIGS. 7a-c demonstrate a comparison of the sensitivity of the method according to the invention and the sensitivity of two other models. FIG. 7a shows the quantization error as a function of time calculated for a given power plant, i.e., the measure of novelty or of how far the test data deviates from the training data of a model. The plot results from a model that was specifically generated for that particular plant alone. The sensitivity achieved there may be considered the maximum achievable sensitivity. The quantization errors reach values up to 100 in one region and up to 20 in a second region of the plot.

FIG. 7b shows the quantization error calculated for the same plant over the same time period considered for FIG. 7a. It results from a comparison of test data against a generic fleet-wide model and scaled using a global scaling factor. The magnitude of the quantization errors reached in this case is much lower than those in FIG. 7a (less than 3 in both regions), indicating a much lower sensitivity.

FIG. 7c finally shows the quantization errors calculated for the same plant in the same time period using a generic network and individual scaling factors according to the invention. The magnitude of quantization errors again reach values around 100 and 20 in two different regions of the plot, indicating a sensitivity comparable to that illustrated in FIG. 7a.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method of monitoring the condition of a fleet of plants, machines, or processes, the method comprising:
    generating and storing a single generic model for all members of the fleet using selected historic data from the fleet taken during normal operation and using novelty detection;
    scaling the selected historic data from the individual fleet members by using scaling factors derived from the historic data prior to including them in the single generic model;
    monitoring the fleet members during operation by taking test data, scaling the test data using said scaling factors, and comparing the scaled data to the generic model; and
    generating a signal on the condition of the fleet members based on the comparison of the measurement data to the generic model;
    wherein scaling the input historic data includes subtracting from each data point a mean value and dividing by the standard deviation;
    forming clusters of the scaled data;
    determining a cluster center for each cluster; and
    calculating a cluster threshold for each cluster.

2. The method according to claim 1, wherein forming clusters comprises k-means clustering.

3. The method according to claim 1, further comprising:
    storing the mean values and standard deviations as scaling factors in a scaling file for further use in the scaling of test data from each individual fleet member during monitoring.

4. The method according to claim 1, further comprising:
    comparing the measured and scaled data to the generic model during monitoring, including establishing a measure of fit using a distance function and determining a quantization error for each measurement data point.

5. The method according to claim 4, wherein establishing a measure of fit comprises establishing with an Euclidian distance function.

6. The method according to claim 4, further comprising:
    generating a signal or alert on the condition of a fleet member based on the quantization error.

7. The method according to claim 1, further comprising:
    pre-processing the data taken from the fleet members for generating the model, for monitoring the fleet, or both, including removing from the historic data transient data and outliers.

8. A method of monitoring the condition of a fleet of plants, machines, or processes, the method comprising:
    generating and storing a single generic model for all members of the fleet using selected historic data from the fleet taken during normal operation and using novelty detection;
    scaling the selected historic data from the individual fleet members by using scaling factors derived from the historic data prior to including them in the single generic model;
    monitoring the fleet members during operation by taking test data, scaling the test data using said scaling factors, and comparing the scaled data to the generic model;
    generating a signal on the condition of the fleet members based on the comparison of the measurement data to the generic model;
    adapting the generic model including taking new data;
    standardizing the new data by subtracting from each data point a mean value and dividing by a standard deviation to generate new, standardized data;
    adding the new, standardized data to the generic model while maintaining all previous data; and
    adapting the scaling factors in the scaling file according to the mean values and standard deviations of the new data.

9. The method according to claim 8, further comprising:
    determining a number of clusters to be formed of the selected historic data by using a Davies-Bouldin cluster validity algorithm or a visual method that analyzes a plot of sum squared error vs. number of clusters.

* * * * *